(12) United States Patent
Kumar et al.

(10) Patent No.: US 12,264,977 B2
(45) Date of Patent: Apr. 1, 2025

(54) COMMON SIGNAL CONDITIONING CIRCUIT FOR TEMPERATURE SENSOR

(71) Applicant: Hamilton Sundstrand Corporation, Charlotte, NC (US)

(72) Inventors: Dhananjay Kumar, Bangalore (IN); Krishan Kant Sharma, Uttar Pradesh (IN); Swathika Sreedhar, Tamil Nadu (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 500 days.

(21) Appl. No.: 17/690,465

(22) Filed: Mar. 9, 2022

(65) Prior Publication Data
US 2023/0221189 A1 Jul. 13, 2023

(30) Foreign Application Priority Data

Jan. 12, 2022 (IN) .............................. 202211001726

(51) Int. Cl.
*G01K 7/20* (2006.01)
(52) U.S. Cl.
CPC ...................... *G01K 7/20* (2013.01)
(58) Field of Classification Search
None
See application file for complete search history.

(56) References Cited

U.S. PATENT DOCUMENTS

| | | | |
|---|---|---|---|
| 4,050,309 A * | 9/1977 | Junkert | G01K 7/21 374/173 |
| 5,030,849 A | 7/1991 | Brokaw | |
| 5,116,136 A | 5/1992 | Newman et al. | |
| 5,345,064 A | 9/1994 | Hesse | |
| 5,481,220 A | 1/1996 | Mildren | |
| 5,604,685 A | 2/1997 | Seesink et al. | |
| 5,700,090 A | 12/1997 | Eryurek | |

(Continued)

FOREIGN PATENT DOCUMENTS

CN 102589741 A * 7/2012

OTHER PUBLICATIONS

Reverter "A tutorial on thermal sensors in the 200th anniversary of the Seebeck effect" IEEE Sensors Journal 21.20 (Aug. 2021): pp. 22122-22132.
Search Report issued in European Patent Application No. 23151309.4; Application Filing Date Jan. 12, 2023; Date of Mailing Jun. 22, 2023 (9 pages).

*Primary Examiner* — Mirellys Jagan
(74) *Attorney, Agent, or Firm* — CANTOR COLBURN LLP

(57) ABSTRACT

A ratiometric temperature measurement system includes a sensing circuit to measure a temperature and a controller to determine a resistance corresponding to the sensing circuit. The sensing circuit includes a temperature sensing circuit and a current sensor. The sensing circuit utilize an electrical current to output a first voltage indicative of a first voltage differential across the temperature sensing circuit and to output a second voltage indicative of a second voltage differential across the current sensor. The controller is configured to determine a resistance corresponding to the temperature sensing circuit based at least in part on the first and second voltage differentials. The controller determines a temperature value indicative of the measured temperature based on the resistance.

18 Claims, 8 Drawing Sheets

(56) References Cited

U.S. PATENT DOCUMENTS

| | | |
|---|---|---|
| 6,928,379 B2 | 8/2005 | Fulton et al. |
| 7,173,414 B2 | 2/2007 | Ricks et al. |
| 9,250,141 B2 | 2/2016 | Engelstad et al. |
| 9,391,630 B2 | 7/2016 | Saloio et al. |
| 9,429,483 B2 | 8/2016 | Engelstad et al. |
| 9,689,828 B2 | 6/2017 | Bridges et al. |
| 9,835,575 B2 | 12/2017 | Cai et al. |
| 10,054,965 B2 | 8/2018 | Lucas et al. |
| 10,972,088 B1 | 4/2021 | Barrenscheen et al. |
| 11,119,134 B2 | 9/2021 | Peterson et al. |
| 2004/0125857 A1 | 7/2004 | Sprock et al. |
| 2005/0052274 A1* | 3/2005 | Mattoon ................ G01K 1/026 374/E7.024 |
| 2010/0177800 A1 | 7/2010 | Rud et al. |
| 2011/0264001 A1 | 10/2011 | Cheung et al. |
| 2015/0198486 A1* | 7/2015 | Mitsui ................ G01K 15/007 374/185 |

\* cited by examiner

COMMON SIGNAL CONDITIONING CIRCUIT FOR TEMPERATURE SENSOR

CROSS-REFERENCE TO RELATED APPLICATIONS

This application claims the benefit of Indian Application No. 202211001726 filed Jan. 12, 2022, the disclosure of which is incorporated herein by reference in its entirety.

BACKGROUND

Embodiments of the present disclosure relate to motor control drive systems for a vehicle, and more particularly, to temperature measurement circuits employed in motor control drive system of an aircraft.

Power switch heat sink temperature is a critical parameter to be monitored in motor control drives. Resistance temperature detectors (RTDs) and thermistors are the most used temperature sensors due to their low cost and reliability. The two types of thermistors that are typically used are Positive Temperature Coefficient (PTC) thermistors and Negative Temperature Coefficient (NTC) thermistors. While RTDs and thermistors both have resistances that vary as a function of temperature, the resistance of a PTC increases linearly in response to temperature changes compared to the resistance of an NTC which decreases linearly in response to temperature changes.

BRIEF DESCRIPTION

According to a non-limiting embodiment, ratiometric temperature measurement system includes a sensing circuit to measure a temperature and a controller to determine a resistance ($R_{T\_SENSOR}$) corresponding to the sensing circuit. The sensing circuit includes a temperature sensing circuit and a current sensor. The sensing circuit utilize an electrical current (Io) to output a first voltage indicative of a first voltage differential ($V_{T\_SENSOR}$) across the temperature sensing circuit and to output a second voltage indicative of a second voltage differential ($V_{C\_SENSOR}$) across the current sensor. The controller is configured to determine a resistance ($R_{T\_SENSOR}$) corresponding to the temperature sensing circuit based at least in part on the first and second voltage differentials ($V_{T\_SENSOR}$ and $V_{C\_SENSOR}$). The controller determines a temperature value ($T_{OUT}$) indicative of the measured temperature based on the resistance ($R_{T\_SENSOR}$).

In addition to one or more of the features described above, or as an alternative to any of the foregoing embodiments, the controller determines a current level ($I_{exe}$) of the current (Io) based on the second voltage differential ($V_{C\_SENSOR}$) indicated by the current sensor and a resistance ($R_{C\_SENSE}$) of the current sensor.

In addition to one or more of the features described above, or as an alternative to any of the foregoing embodiments, the resistance ($R_{T\_SENSOR}$) of the current sensor is determined as a ratio of the first voltage differential ($V_{T\_SENSOR}$) to the current level ($I_{exe}$).

In addition to one or more of the features described above, the controller comprises memory and a processor. The memory is configured to store a look-up table (LUT) populated with a plurality of predetermined resistance values that are mapped to corresponding predetermined temperature values. The processor is in signal communication with the memory. The processor is configured to compare the resistance ($R_{T\_SENSOR}$) of the current sensor to the predetermined resistance values, select a predetermined temperature value corresponding to the predetermined resistance value that matches the resistance ($R_{T\_SENSOR}$), and output the selected predetermined temperature value as the temperature value ($T_{OUT}$).

In addition to one or more of the features described above, the sensing circuit comprises a temperature sensor configured to effect the first voltage differential ($V_{T\_SENSOR}$) in response to the current (Io); and an adjustable linearization resistance element ($R_p$) configured to selectively add or remove a resistance realized by the temperature sensor.

In addition to one or more of the features described above, the temperature sensor includes a first terminal connected to the current sensor to receive the current and a second terminal connected to a ground potential.

In addition to one or more of the features described above, a current excitation circuit including a constant current source is configured to generate the current.

In addition to one or more of the features described above, the current sensor is in signal communication with the current excitation circuit and is configured to effect the second voltage differential ($V_{C\_SENSOR}$) thereacross in response to the current.

In addition to one or more of the features described above, the current sensor includes a current sense resistor having a fixed resistance that defines the resistance ($R_{C\_SENSE}$) of the current sensor.

In addition to one or more of the features described above, a voltage drop across the sense resistor defines the second voltage differential ($V_{C\_SENSOR}$).

In addition to one or more of the features described above, the system includes a multiplexer (MUX) and an amplifier circuit. Th MUX is configured to selectively output the first filtered voltage differential ($V_{T\_SENSOR}$) or the second filtered voltage differential ($V_{C\_SENSOR}$) in response to a control signal generated by the controller. The amplifier circuit is in signal communication with the MUX. The amplifier circuit is configured to amplify the first voltage differential ($V_{T\_SENSOR}$) and to amplify the second voltage differential ($V_{C\_SENSOR}$).

In addition to one or more of the features described above, a filter circuit in signal communication with the sensing circuit, the filter circuit configured to filter the first voltage differential ($V_{T\_SENSOR}$) and the second voltage differential ($V_{C\_SENSOR}$) and output the filtered first and second voltage differentials to the amplifier circuit.

In addition to one or more of the features described above, an analog-to-digital converter (ADC) including an input connected to the amplifier circuit and an output connected to the controller, the ADC configured to generate a first digital signal indicative (of the first voltage differential ($V_{T\_SENSOR}$) and a second digital signal indicative of the second voltage differential ($V_{C\_SENSOR}$).

In addition to one or more of the features described above, the temperature sensor is a RTD, and the adjustable linearization resistance element is connected in parallel with the RTD so as to establish an open circuit in parallel with the RTD.

In addition to one or more of the features described above, the temperature sensor is an NTC and the adjustable linearization resistance element is connected in parallel with the NTC to establish a targeted resistance that shunts the NTC and linearizes the first voltage differential.

According to another non-limiting embodiment, a method of measuring a temperature is provided. The method comprises delivering an electrical current (Io) to a sensing circuit, outputting a first voltage from a temperature sensing circuit included in the sensing circuit in response to the electrical current, and outputting a second voltage from a current sensor included in the sensing circuit. The first voltage is indicative of a first voltage differential ($V_{T\_SENSOR}$) and the second voltage is indicative of a second voltage differential ($V_{C\_SENSOR}$). The method further comprises determinizing a resistance ($R_{T\_SENSOR}$) corresponding to the temperature sensing circuit based at least in part on the first and second voltage differentials ($V_{T\_SENSOR}$ and $V_{C\_SENSOR}$). The method further comprises determining a temperature value ($T_{OUT}$) indicative of the temperature based on the resistance ($R_{T\_SENSOR}$).

In addition to one or more of the features described above, or as an alternative to any of the foregoing embodiments, the method further comprises determining, using the controller, a current level ($I_{exe}$) of the current ($I_o$) based on the second voltage differential ($V_{C\_SENSOR}$) indicated by the current sensor and a resistance ($R_{C\_SENSE}$) of the current sensor.

In addition to one or more of the features described above, or as an alternative to any of the foregoing embodiments, the method further comprises determining the resistance ($R_{T\_SENSOR}$) of the current sensor as a ratio of the first voltage differential ($V_{T\_SENSOR}$) to the current level ($I_{exe}$).

In addition to one or more of the features described above, or as an alternative to any of the foregoing embodiments, the method further comprises selectively adding or removing a resistance realized by the temperature sensor using an adjustable linearization resistance element ($R_p$).

In addition to one or more of the features described above, or as an alternative to any of the foregoing embodiments, the method further comprises populating a look-up table (LUT) with a plurality of predetermined resistance values that are mapped to corresponding predetermined temperature values; comparing, by the controller, the resistance ($R_{T\_SENSOR}$) of the current sensor to the predetermined resistance values; selecting, by the controller, a predetermined temperature value corresponding to the predetermined resistance value that matches the resistance ($R_{T\_SENSOR}$); and outputting, by the controller, the selected predetermined temperature value as the temperature value ($T_{OUT}$)

Additional features and advantages are realized through techniques described herein. Other embodiments and aspects are described in detail herein. For a better understanding, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
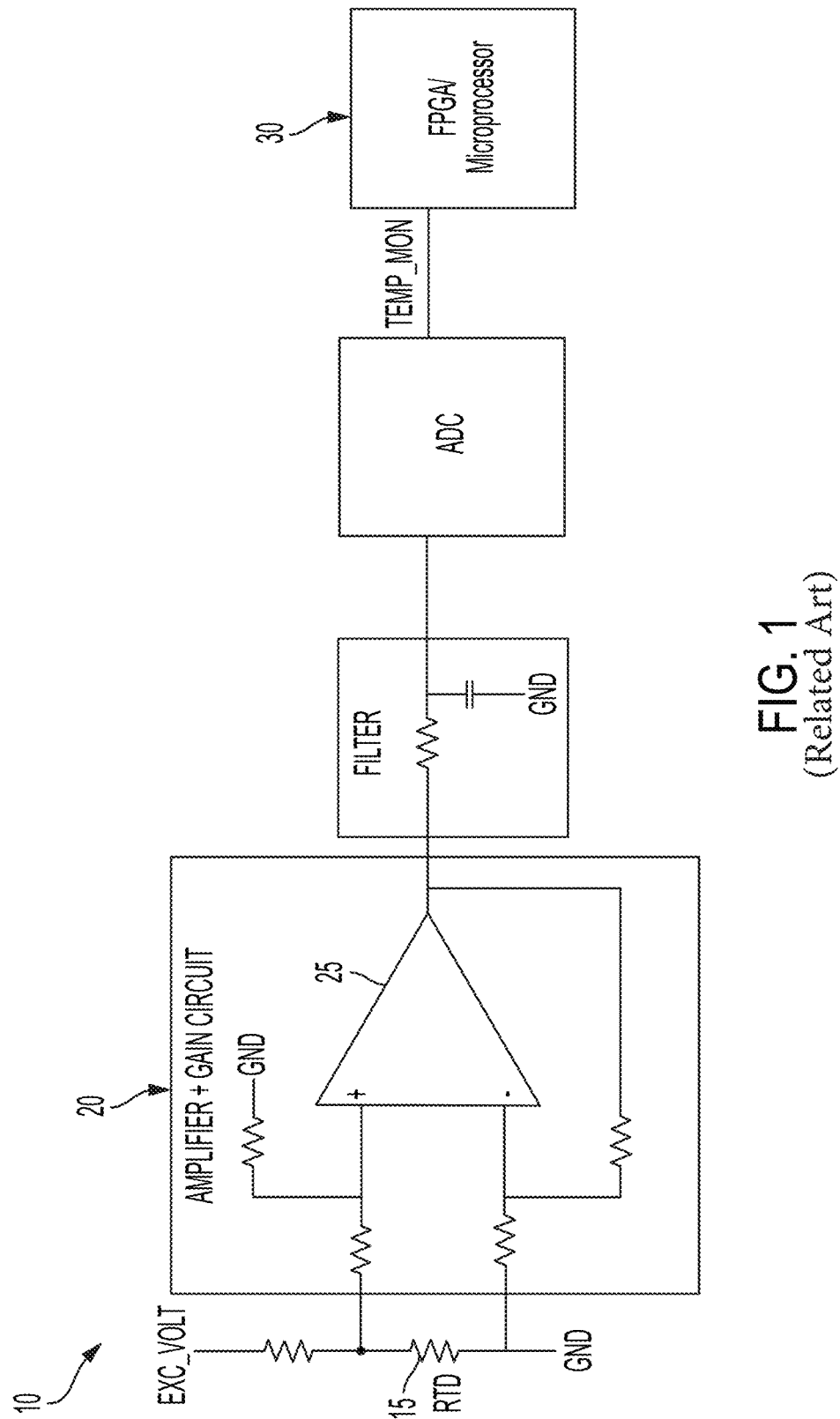
FIG. 1 is a block diagram of a conventional RTD temperature measurement circuit.

Turning to an overview of technologies that are more specifically relevant to aspects of the present disclosure, temperature measurement circuits employed in motor control drive systems of an aircraft typically implement an RTD or a NTC to perform temperature measurements. A conventional RTD temperature measurement circuit 10 is illustrated in FIG. 1, and utilizes a RTD 15 including a metal element such as platinum, for example, which serves as the RTD temperature sensing element. For example, RTD are commonly manufactured as a platinum 100-type RTD (Pt100) or a platinum 1000-type RTD (Pt1000). A Pt100 RTD has a nominal resistance of 100Ω at ice point (e.g., 0° C.), while a Pt1000 RTD has a nominal resistance of 1,000Ω at 0° C. Linearity of the characteristic curve, operating temperature range, and response time are the same, or substantially the same, for both a Pt100 RTD and a Pt1000 RTD. The temperature coefficient of resistance is also the same, or substantially the same, for both a Pt100 RTD and a Pt1000 RTD.

The RTD 15 temperature measurement is determined based on the principle that the resistance of the metal element changes with temperature. In practice, the RTD 15 is located in proximity to the area where temperature is to be measured. An electrical voltage is applied across the RTD 15 to induce current flow through the metal element. The voltage across the RTD 15 is measured, and a corresponding resistance value of the metal element is then calculated using a FPGA 30 or processor 30, for example, to obtain a measured resistance of the metal element. This resistance value is then correlated to temperature based upon the known resistance characteristics of the metal element. The excitation current, however, causes the metal sensing element to heat, thus introducing a "self-heating" effect, which can cause inaccurate or erroneous temperature measurements.

To avoid the self-heating effect, the current level of the electrical current delivered through the metal element is reduced. The reduced current level, however, also reduces the voltage level across the RTD 15. Therefore, conventional circuits employ an amplifier circuit 20 downstream from the RTD 15. The amplifier circuit 20 includes an amplifier 25, which amplifies the voltage across the RTD 15 to obtain voltage sufficient to determine metal element resistance. However, the amplifier 25 introduces an offset error in the measured RTD voltage thereby causing inaccurate temperature measurements.

Figure 2:
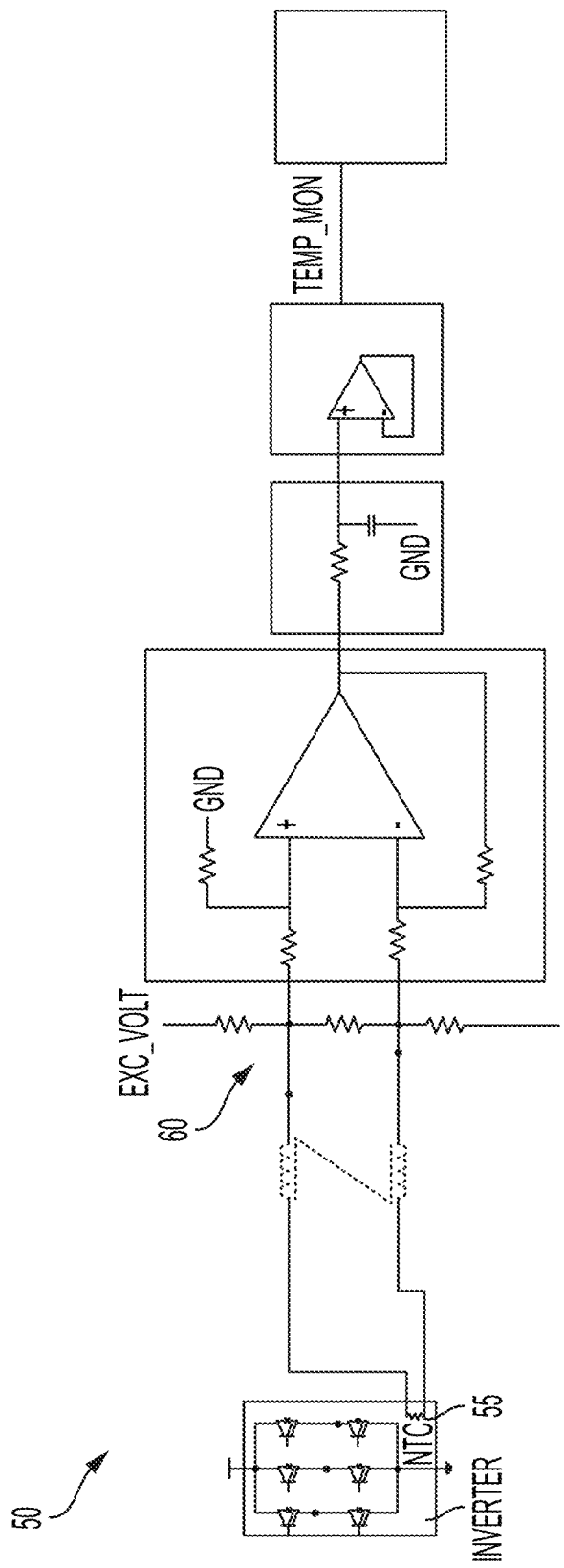
FIG. 2 is a block diagram of a conventional NTC temperature measurement circuit.
Figure 3:
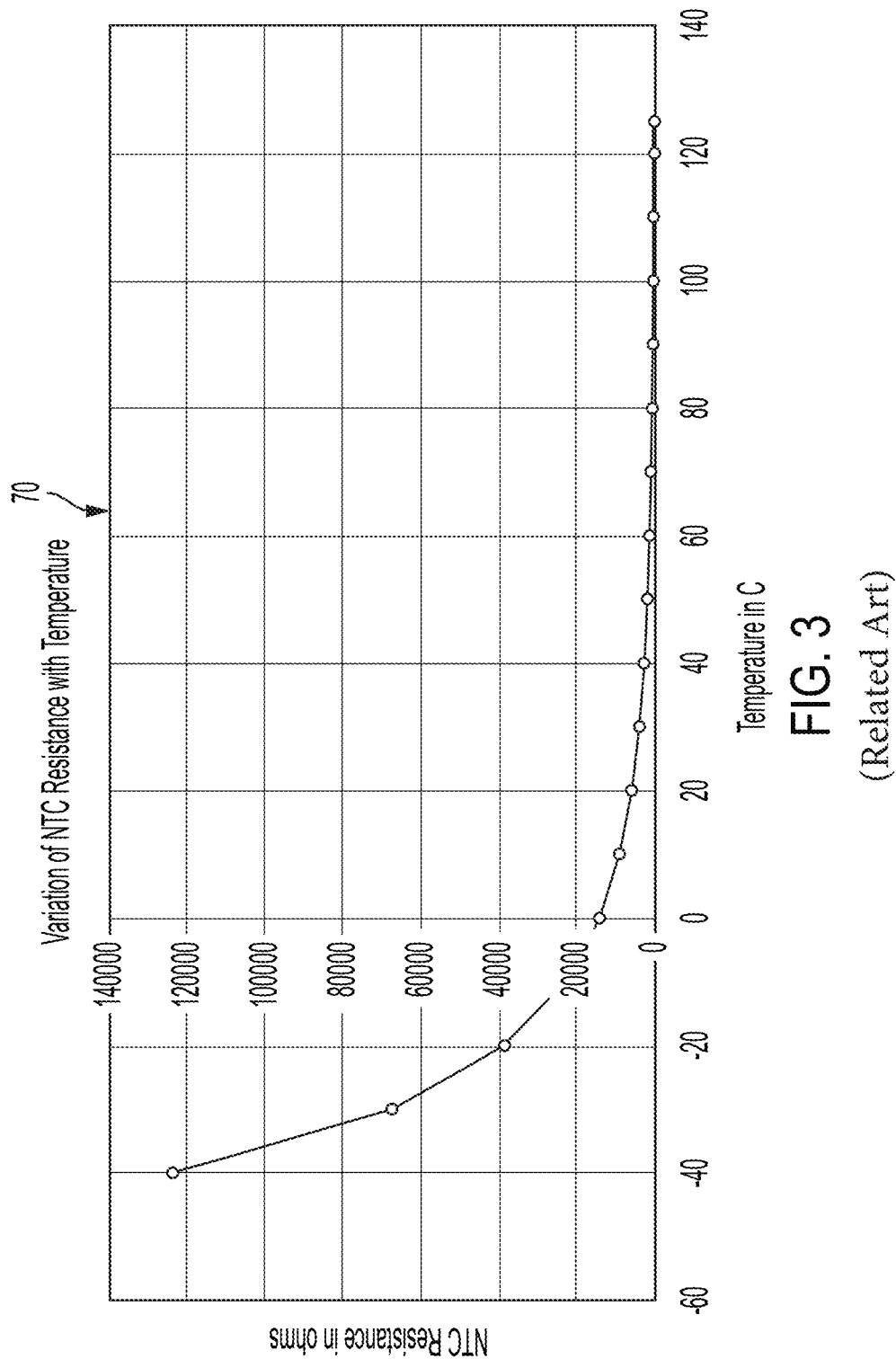
FIG. 3 is a diagram illustrating a relationship between temperature versus resistance associated with the conventional NTC temperature measurement circuit shown in FIG. 2.

A conventional NTC temperature measurement circuit 50 is illustrated in FIG. 2. Rather than implementing an RTD, the NTC temperature measurement circuit 50 employs an NTC thermistor 55 (referred to herein simply as an NTC 55) that serves as a temperature sensor. Using an NTC provides a low-cost solution over higher accuracy across the wide range of temperature sense compared to RTDs. For example, RTDs are more accurate than NTCs in positive temperature measurements ranging 0 to 130 degrees Celsius (° C.) in given application, whereas NTCs provide greater accuracy below 0° C. However, the behavior of the NTC 55 as its resistance varies with respect to temperature changes is linear over a shorter range compared to an RTD. As shown in FIG. 3, for example, graph 70 illustrates that the NTC 55 provides an undesirable exponential relationship between resistance and temperature below 0 degrees Celsius (° C.), and in particular between temperatures of about −55° C. and about 130° C. This non-linear behavior also exponentially increases the error in temperature measurement, particularly for measurements in the range of about −55 degrees Celsius (° C.) and about 130° C.

The undesired exponential behavior of convention NTC temperature measurement circuits typically require the need to implement an additional linearization circuit 60 (shown in FIG. 2) to widen the temperature measurement range of the NTC 55 for certain temperature measurement applications. The added linearization circuit however, results in a temperature measurement circuit with increased circuit complexity and costs. Moreover, the RTD provides a significantly more linear behavior than the NTC itself (e.g., an NTC excluding the linearization circuit) and therefore does not require implementing any linearization techniques. As a result, a conventional NTC temperature measurement circuit 50 is not compatible with an RTD such that two separate circuit topologies are required when implementing an RTD as a temperature sensor versus implementing an NTC as a temperature sensor.

Turning now to a more detailed description of the inventive teachings, one or more non-limiting embodiments of the present disclosure provide a ratiometric temperature measurement system configured to perform a ratio metric measurement technique that cancels and effectively removes the offset error introduced by the amplifier typically employed in conventional RTD-based and NTC-based temperature measurement circuits. In addition, the ratiometric temperature measurement system implements an adjustable linearization resistance element that facilitates compatibility for using either an RTD or an NTC as the temperature sensor. In one or more non-limiting embodiments, the adjustable linearization resistance element can selectively remove a resistance when utilizing an RTD as the temperature sensor and introduce a resistance when utilizing an NTC as the temperature sensor. The added resistance effectively shunts the current source to linearize the behavior of the NTC. In this manner, the ratiometric temperature system can utilize the NTC as a temperature sensor in applications that require measurements at wider targeted temperature ranges (e.g., temperatures ranging from 50° C.-200° C.).

Figure 4:
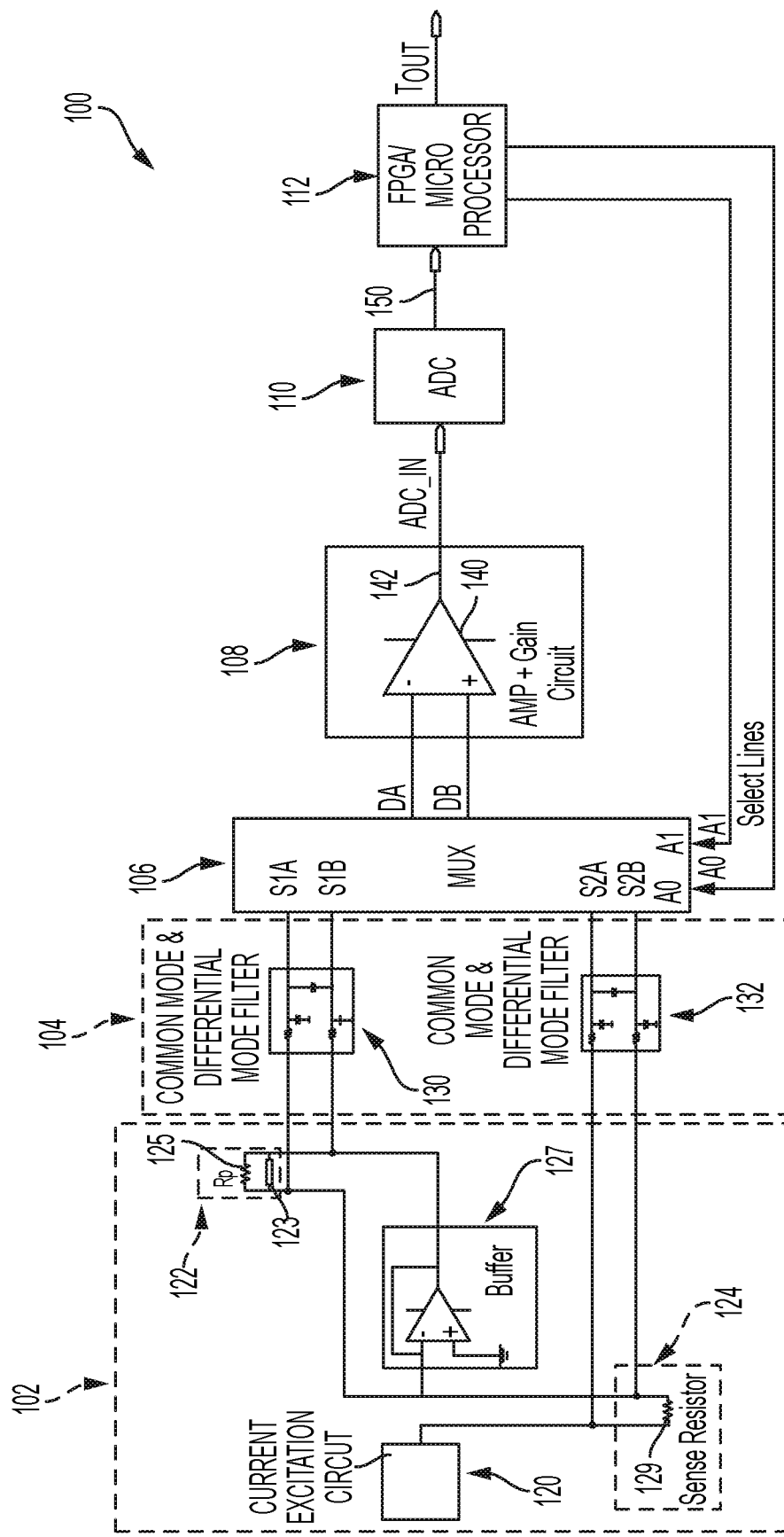
FIG. 4 is a block diagram of a ratiometric temperature measurement system according to a non-limiting embodiment.

With reference now to the FIG. 4, a ratiometric temperature measurement system 100 is illustrated according to a non-limiting embodiment of the present disclosure. The ratiometric temperature measurement system 100 includes a sensing circuit 102, a filter circuit 104, a multiplexer (MUX) 106, an amplifier circuit 108, an analog-to-digital converter (ADC) 110, and a controller 112. Although the ADC 110 and controller 112 are shown as two separate and independent components, it should be appreciated that the ADC 110 and controller 112 can be implemented together as a single controller or FPGA.

The sensing circuit 102 includes a current excitation circuit 120, a temperature sensing circuit 122, and a current sensor 124. The current excitation circuit 120 includes a constant current source configured to output an electrical excitation current (Io). Based on the current (Io), the sensing circuit 102 outputs a first voltage indicative of a first voltage differential ($V_{T\_SENSOR}$) across the temperature sensing circuit 122 and a second voltage indicative of a second voltage differential ($V_{C\_SENSOR}$) across the current sensor 124.

The temperature sensing circuit 122 includes a temperature sensor 123 and an adjustable linearization resistance element ($R_p$) 125. The temperature sensing circuit 122 is configured to produce a voltage differential ($V_{T\_SENSOR}$) that varies in response to a varying resistance of the temperature sensor 123. The temperature sensor 123 can include either a RTD or an NTC, each which is configured to effect the first voltage differential ($V_{T\_SENSOR}$). A first terminal of the temperature sensor 123 can serve as an input to the sensing circuit 122 and is connected to the current sensor 124 to receive the bias current (Io). A second terminal of the temperature sensor 123 can serve as an output of the sensing circuit 102 and is connected to a ground potential.

In one or more non-limiting embodiments, a buffer 127 (sometimes referred to as a "line buffer") can be implemented to prevent the ground protentional from floating. When the buffer 127 is implemented, the buffer inverting input (−) is connected to the current sensor 124, the buffer non-inverting input (+) is connected to the ground potential, and the buffer output is connected to the second terminal of the temperature sensor 123 to provide a non-floating ground potential.

The adjustable linearization resistance element 125 is connected in parallel with the temperature sensor 123. The adjustable linearization resistance element 125 includes a first terminal connected in common with the output of the current sensor 124 and the input of the temperature sensor 123. An opposing second terminal of the adjustable linearization resistance element 125 is connected in common with the ground potential and the output of the temperature sensor 123.

Figure 5:
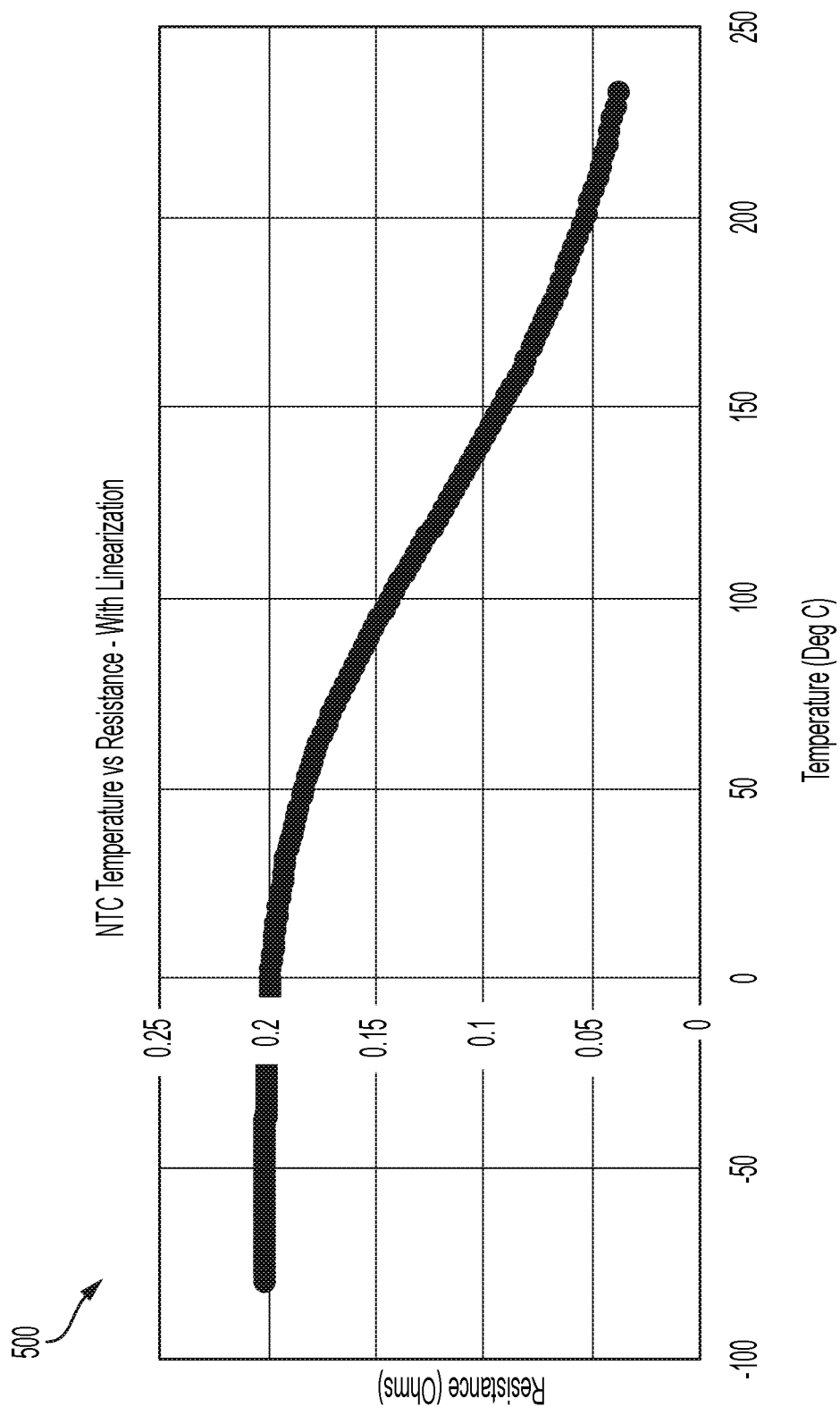
FIG. 5 is a diagram illustrating a relationship between temperature versus resistance associated with an NTC implemented in the ratiometric temperature measurement system of FIG. 4 according to a non-limiting embodiment.

In at least one non-limiting embodiment, the adjustable linearization resistance element 125 is implemented as a potentiometer or rheostat, for example, which is capable of varying (e.g., adding or removing) its resistance and therefore the resistance realized by the temperature sensor 123. When an NTC is utilized as the temperature sensor 123, for example, the adjustable linearization resistance element 125 can be adjusted to set a resistance that shunts the NTC and effectively linearizes the NTC output voltage over a targeted temperature range (e.g., from about −55° C. and about 130° C.). Diagram 500 shown in FIG. 5 illustrates the resulting linearized relationship between temperature versus resistance provided by the NTC.

When, however, a RTD is utilized as the temperature sensor 123, the adjustable linearization resistance element 125 can be adjusted to a maximum resistance that effectively produces a virtual open circuit across the adjustable linearization resistance element 125 and in parallel with the RTD. Accordingly, the RTD effectively realizes a maximum resistance (e.g., an open circuit) in parallel and operates virtually alone without to provide a substantially linearized voltage output that is inherently produced by the RTD. In this manner, the ratiometric temperature measurement system 100 can utilize either an NTC or a RTD as a temperature sensor 123, both which can provide a linearized relationship between temperature versus resistance over similar targeted temperature ranges (e.g., from about −55° C. and about 130° C.).

According to another non-limiting embodiment, the adjustable linearization resistance element 125 is a linearization resistor that be selectively connected or disconnected in parallel with the temperature sensor 123, or completely interchangeable (i.e., selectively added or removed). The linearization resistor has a fixed resistance that is determined (e.g., through pre-testing)) to linearize an NTC over a targeted temperature range (e.g., from about −55° C. and about 130° C.). In such an example, the linearization resistance element 125 can be connected or added when an NTC is utilized as the temperature sensor 123 such that the NTC realizes the resistance set by the added linearization resistor. When the NTC is replaced with the RTD, the linearization resistance element 125 can be conveniently disconnected or completely removed. Accordingly, the RTD effectively realizes a maximum resistance (e.g., an open circuit) in parallel and operates alone to provide a substantially linearized voltage output that is inherently produced by the RTD. In either embodiment described above, the adjustable linearization resistance element 125 allows for utilizing either an NTC or a RTD as a temperature sensor 123 without requiring substantial modification of the ratiometric temperature measurement system 100.

The current sensor 124 is in signal communication with the current excitation circuit 102 to receive the bias excitation current (Io). In one or more non-limiting embodiments, the current sensor 124 is constructed using a current sense resistor 129 that has a fixed resistance ($R_{C\_SENSE}$). Accordingly, a voltage drop across the current sense resistor 129 defines the second voltage differential ($V_{C\_SENSOR}$).

The filter circuit 104 is in signal communication with the sensing circuit 102 and is configured to filter the first voltage differential ($V_{T\_SENSOR}$) and the second voltage differential ($V_{C\_SENSOR}$). The filter circuit 104 includes a first differential mode filter 130 and a second differential mode filter 132. A first input of the first differential mode filter 130 is connected in common with the input of the temperature sensor 123 and the output of the current sensor 124. A second input of the first differential mode filter 130 is connected in common with the output of the temperature sensor 123 and the ground potential. A first input of the second differential mode filter 132 is connected in common with the output of the current excitation circuit 120 and the input of the current sensor 124. A second input of the second differential mode filter 132 is connected in common with the output of the current sensor 124 and the input of the temperature sensor 123.

The first differential mode filter 130 and the second differential mode filter 132 can each be constructed using a pair of RC filters and a capacitor that bridges the filter outputs. For example, a first RC filter can be connected between the first input of the first differential mode filter 130 and the first output of the first differential mode filter 130. A second RC filter can be connected between the second input of the first differential mode filter 130 and the second output of the first differential mode filter 130. The capacitor can include a first terminal connected in common with the first RC filter and the first output and a second terminal connected in common with the second RC filter and the second output.

Likewise, the second differential mode filter 132 can include a first RC filter that is connected between the first input of the second differential mode filter 132 and the first output of the second differential mode filter 132. A second RC filter can be connected between the second input of the second differential mode filter 132 and the second output of the second differential mode filter 132. The capacitor of the second differential mode filter 132 includes a first terminal that is connected in common with the first RC filter and the first output and a second terminal connected in common with the second RC filter and the second output.

The multiplexer (MUX) 106 is configured to selectively output the first filtered voltage differential ($V_{T\_SENSOR}$) or the second filtered voltage differential ($V_{C\_SENSOR}$). The MUX 106 includes a first temperature sensor voltage input (S1A), a second temperature sensor voltage input (S1B), a first current sensor voltage input (S2A), and a second current sensor voltage input (S2B).

The first temperature sensor voltage input (S1A) is connected to the first output of the first differential mode filter 130. The second temperature sensor voltage input (S1B) is connected to the second output of the first differential mode filter 130. The first current sensor voltage input (S2A) is connected to the first output of the second differential mode filter 132. The second current sensor voltage input (S2B) is connected to the second output of the second differential mode filter 132.

The MUX 106 further includes a first selector line input (A0), a second selector line input (A1), a first output line (DA) and a second output line (DB). The first selector line input (A0) and the second selector line input (A1) are each connected to the controller 112. The controller 112 can output control signals for selecting signals applied to the first temperature sensor voltage input (S1A) and the second temperature sensor voltage input (S1B) to be output on the first and second output lines DA and DB, respectively, or for selecting signals applied to the first temperature sensor voltage input (S1A) and the second temperature sensor voltage input (S1B) to be output on the first and second output lines DA and DB, respectively. In one or more non-limiting embodiments, the voltage differential measurement across the temperature sensor 123 and the current sensor 124 are time multiplexed with a bandwidth that is greater than 1 kilohertz (KHz) per 1 millisecond (ms). That is, the first and second temperature sensor voltage inputs (S1A and S1B) receive the voltage determined by the resistance of the temperature sensor 123, while the first and second current sensor voltage inputs (S2A and S2B) receive the voltage determined by the bias current (Io) through the current sensor 124.

As described in greater detail below, the controller 112 calculates a ratio of the temperature sensor voltage differential (e.g., voltage drop across the temperature sensor 123) and the current level ($I_{exe}$) of the bias current ($I_o$). In one or more non-limiting embodiments, the bias current (Io) can be calculated based on the voltage drop across the current sense resistor 129 and the resistance of the current sense resistor 129. As same current is passed through sense resistor and sensor, the ratio calculation cancels out the gain error while also providing the resistance of the temperature sensor 123 as described in greater detail below. In addition, the mechanical time constant of heat rise is typically less than 5 ms even at a 0.1 degree Celsius (° C.) change in a practical case of module temperature measurements. Therefore, the ratio metric measurements performed by the ratiometric temperature measurement system 100 described herein provide very accurate results with minimized gain errors.

In one or more non-limiting embodiments, the controller 112 utilizes a truth table (e.g., stored in memory) to generate the control signals used to select the pair of MUX inputs (e.g., S1A/S1B or S2A/S2B) to be output on the respective output lines DA and DB. The truth table can be defined as follows:

TABLE 1

| A0 | A1 | On Switch Pair | Functionality |
|---|---|---|---|
| 0 | 0 | S1A & S1B | Output first voltage differential ($V_{T\_SENSOR}$) |
| 0 | 1 | S2A & S2B | Output second filtered voltage differential ($V_{C\_SENSOR}$) |

As described in Table 1 above, applying a first control signal having a logic "0" to the first selector line (A0) and a second control signal having a logic "0" to the second selector line (A1) selects for output the signals applied to the first temperature sensor voltage input (S1A) and the second temperature sensor voltage input (S1B). Accordingly, the first voltage differential ($V_{T\_SENSOR}$) provided by the temperature sensing circuit 122 is output using the first and second output lines DA and DB. Applying a second control signal having a logic "0" to the first selector line (A0) and a second control signal having a logic "1" to the second selector line (A1) selects for output the signals applied to the first current sensor voltage input (S2A) and the second current sensor voltage input (S2B). Accordingly, the second voltage differential ($V_{C\_SENSOR}$) provided by the current sensor 124 is output using the first and second output lines DA and DB.

The amplifier circuit 108 is in signal communication with the MUX 106 to amplify the first filtered voltage differential ($V_{T\_SENSOR}$) or the second filtered voltage differential ($V_{C\_SENSOR}$) selected for output by the controller 112. The amplifier circuit 108 includes an amplifier 140 including an inverting input (−) connected to the first MUX output line (DA) and a non-inverting input (+) connected to the second MUX output line (DB). Accordingly, the amplifier output 142 provides an amplified first filtered voltage differential ($V_{T\_SENSOR}$) when the controller 112 selects the first and second temperature sensor voltage inputs (S1A and S1B), and provides an amplified second filtered voltage differential ($V_{C\_SENSOR}$) when the controller 112 selects the first and second current sensor voltage inputs (S2A and The analog-to-digital converter (ADC) 110 is in signal communication with the output 142 of amplifier circuit 108 to convert the analog signal received from the MUX 106 into a digital output signal. Accordingly, the ADC 110 outputs a first digital signal ($V_{oT}$) indicative of the first voltage differential ($V_{T\_SENSOR}$) in response to receiving the amplified first filtered voltage differential ($V_{T\_SENSOR}$) and generates a second digital signal indicative ($V_{oC}$) of the second voltage differential ($V_{C\_SENSOR}$) in response to receiving the amplified second filtered voltage differential ($V_{C\_SENSOR}$).

The controller 112 is in signal communication with the ADC output 150 to receive the first digital signal ($V_{oT}$) indicative of the first voltage differential ($V_{T\_SENSOR}$) and the second digital signal ($V_{oC}$) indicative of the second voltage differential ($V_{C\_SENSOR}$), and calculates the resistance ($R_{T\_SENSOR}$) of the temperature sensor 123 based at least in part on the first and second voltage differentials ($V_{T\_SENSOR}$ and $V_{C\_SENSOR}$). Based on the resistance ($R_{T\_SENSOR}$) of the temperature sensor 123, the controller 112 determines a temperature value ($T_{OUT}$) measured by the sensing circuit 102.

Figure 6:
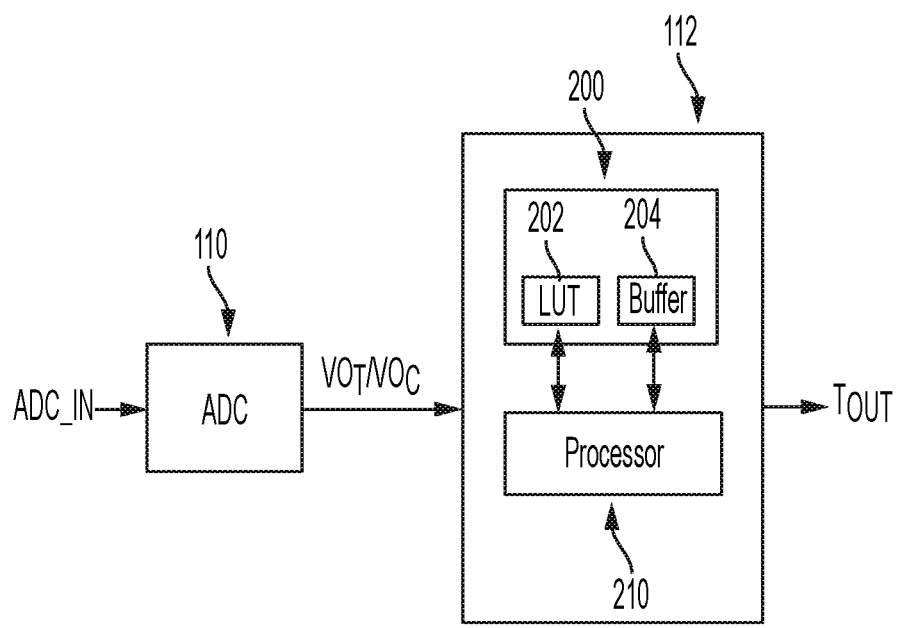
FIG. 6 is block diagram of a controller configured to perform a ratiometric temperature measurement according to a non-limiting embodiment.

Turning to FIG. 6, the controller 112 is illustrated in greater detail according to a non-limiting embodiment. The controller 112 includes memory 200 and a processor 210. The memory 200 includes a look-up-table (LUT) 202 and a buffer 204. The LUT 202 is configured to populate a plurality of predetermined resistance values that are mapped (e.g., indexed) to corresponding predetermined temperature values.

The buffer 204 is configured to store various values used to calculate the resistance ($R_{T\_SENSOR}$) of the temperature sensor 123 and the temperature value ($T_{OUT}$) measured by the sensing circuit 102. In one or more non-limiting embodiments, the buffer 204 includes a resistance value indicative of the fixed resistance ($R_{C\_SENSE}$), a value indicative of the first voltage differential ($V_{T\_SENSOR}$), a value indicative of the second voltage differential ($V_{C\_SENSOR}$), a value indicative of the current level ($I_{exe}$), and the calculated resistance ($R_{T\_SENSOR}$).

The processor 210 is in signal communication with the memory 200. As described herein, the processor 210 is configured to calculate the resistance ($R_{T\_SENSOR}$) of the temperature sensor 123 based at least in part on the first and second voltage differentials ($V_{T\_SENSOR}$ and $V_{C\_SENSOR}$). For example, the processor 210 can determine a current level ($I_{exe}$) of the current based on the second voltage differential ($V_{C\_SENSOR}$) indicated by the current sensor and the fixed resistance ($R_{C\_SENSE}$) of the sense resistor. The resistance ($R_{T\_SENSOR}$) of the temperature sensor 123 is effectively a ratio of the first voltage differential ($V_{T\_SENSOR}$) to the current level ($I_{exe}$). Accordingly, the processor 210 can calculate the resistance ($R_{T\_SENSOR}$) according to the equation:

$$R_{T\_SENSOR}=(V_{T\_SENSOR})/(I_{exe}) \qquad \text{Eq. 1}$$

Once the resistance ($R_{T\_SENSOR}$) of the temperature sensor 123 is determined, the processor 210 can compare the resistance ($R_{T\_SENSOR}$) to the predetermined resistance values included in the LUT 202 and select a predetermined temperature value corresponding to the predetermined resistance value that matches the resistance ($R_{T\_SENSOR}$). Accordingly, the controller 112 outputs the selected predetermined temperature value as the temperature value ($T_{OUT}$) that is indicative of the temperature value measured by the sensing circuit 102.

Figure 7A:
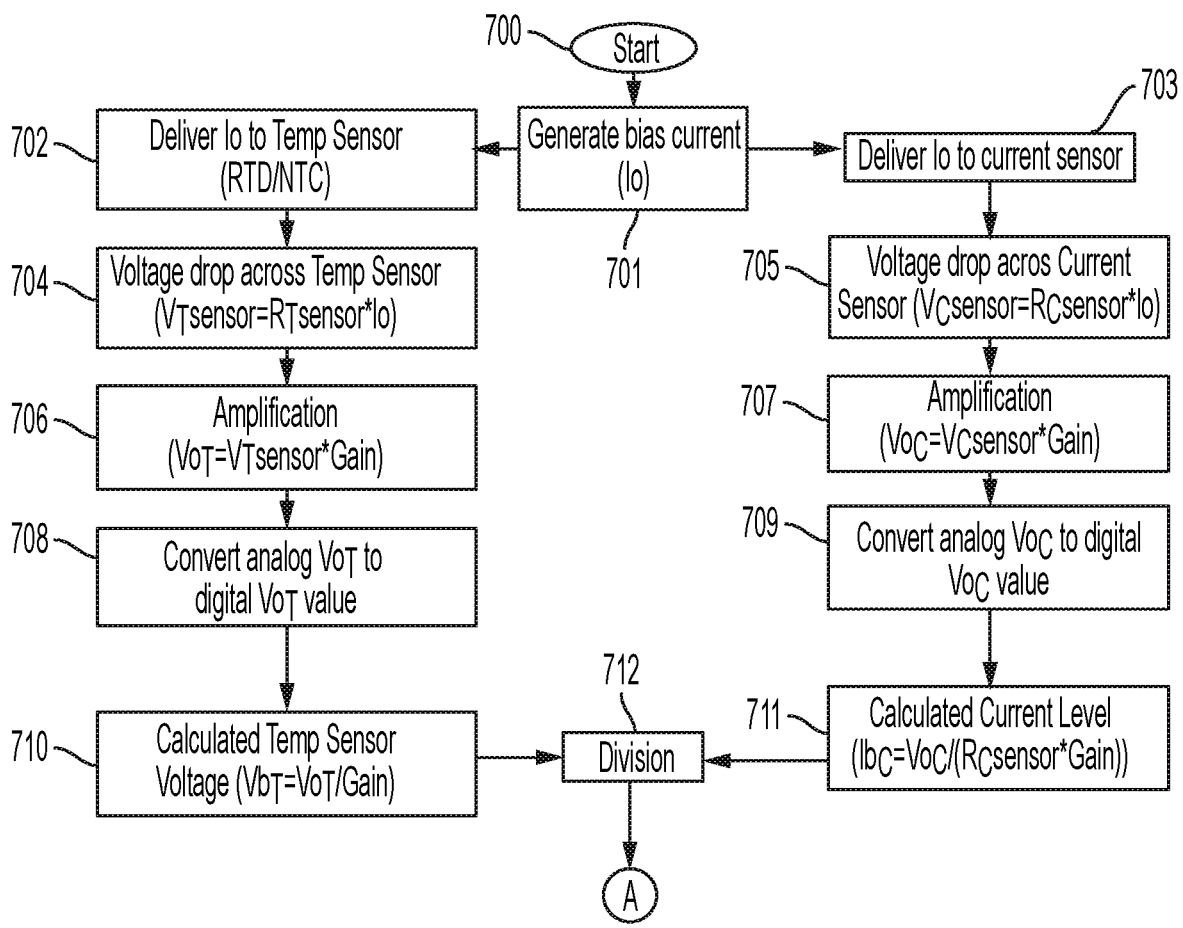
FIGS. 7A and 7B depict a flow diagram illustrating a method of performing a ratiometric temperature measurement according to a non-limiting embodiment.
Figure 7B:
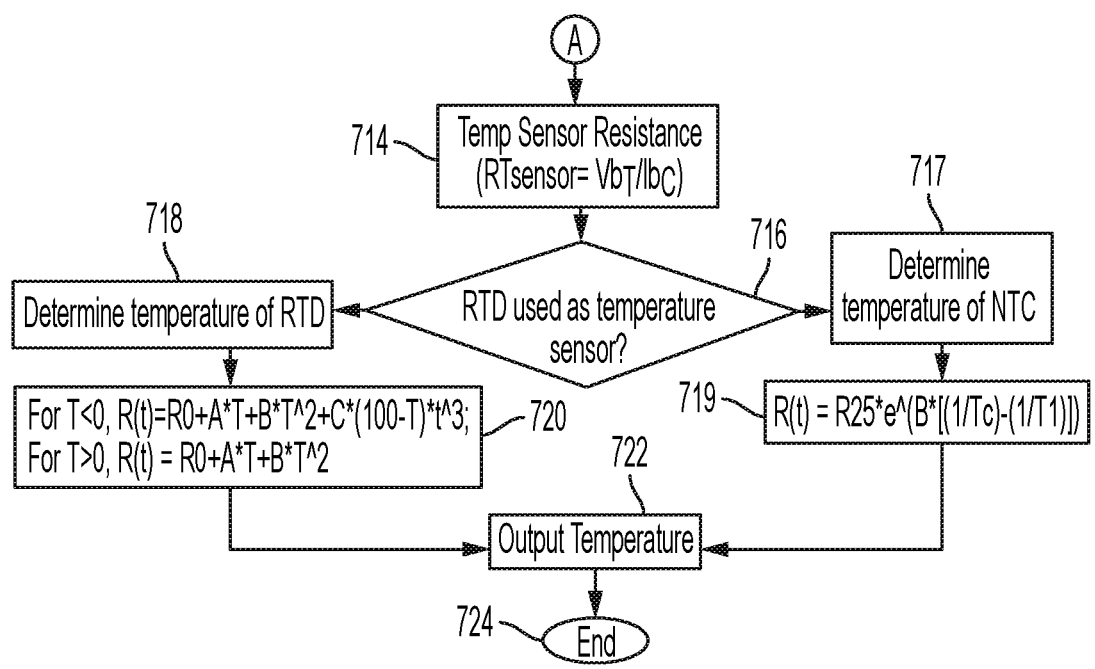

Turning now to FIGS. 7A and 7B, a flow diagram depicts a method of performing a ratiometric temperature measurement according to a non-limiting embodiment. The method begins at operation 700 and at operation 701 a constant bias current ($I_o$) is generated using a current excitation circuit. Turning first to operation 702, the current ($I_o$) is delivered to the temperature sensing circuit. As described herein, the ratiometric temperature measurement system 100 allows for the temperature sensor to be constructed as either a RTD or an NTC. At operation 704, a voltage differential (i.e., voltage drop) is induced across the temperature sensor in response to the current flowing therethrough. The voltage differential ($V_{Tsensor}$) across the temperature sensor can be expressed as: $V_{Tsensor}=(R_{Tsensor}*I_o)$, where $R_{Tsensor}$ is the resistance corresponding to the temperature sensor. At operation 706, the temperature sensor voltage differential ($V_{Tsensor}$) is amplified, e.g., by an amplifier and gain circuit. The amplified temperature sensor voltage ($V_{oT}$) can be expressed as: $V_{oT}=(V_{Tsensor}*Gain)$, where "Gain" is the gain of the amplifier included in the amplifier circuit. At operation 708, the analog amplified temperature sensor voltage ($V_{oT}$) is converted to a digital equivalent temperature sensor voltage ($V_{oT}$). At operation 710, a back calculated temperature sensor voltage ($V_{bT}$) can be determined (e.g., by a controller) by dividing the temperature sensor voltage ($V_{oT}$) by the Gain of the amplifier, and can be expressed as: $V_{bT}=(V_{oT}*Gain)$. The back calculated temperature sensor voltage ($V_{bT}$) can be stored in memory of the controller and utilized to determine the resistance ($R_{Tsensor}$) of the temperature sensor as described in greater detail below.

Turning now to operation 703, the current (Io) is delivered to the current sensor. In one or more non-limiting embodiments, the current sensor includes a current resistor that defines a resistance (RCsensor) of the current sensor. At operation 705, a voltage differential (i.e., voltage drop) is induced across the current sensor in response to the current flowing therethrough. The voltage differential (VCsensor) across the current sensor can be expressed as: VCsensor=

(RCsensor*Io), where RCsensor is the resistance corresponding to the current sensor. At operation 707, the current sensor voltage differential (VCsensor) is amplified, e.g., by the amplifier and gain circuit. The amplified current sensor voltage (VoC) can be expressed as: VoC=(VCsensor*Gain), where "Gain" is the gain of the amplifier. At operation 709, the analog amplified current sensor voltage (VoC) is converted to a digital equivalent current sensor voltage (VoC). At operation 711, a back calculated current level (IbC) of the current flowing through the current sensor can be determined (e.g., by the controller) by dividing the current sensor voltage (VoC) by a product of the current sensor resistance (RCsensor) and the Gain of the amplifier, and can be expressed as: IbC=(VoC/(RCsensor*Gain)). The back calculated current level (IbC) can be stored in the memory of the controller and utilized to determine the resistance (RTsensor) of the temperature sensor as described in greater detail below. A ratio between the back calculated temperature sensor voltage (VbT) and the back calculated current level (IbC) can be determined by performing a division at operation 712.

Turning to operation 714 (see FIG. 7B), the temperature sensor resistance ($R_T$sensor) is determined as a ratio between the back calculated temperature sensor voltage ($V_{bT}$) and the back calculated current level ($I_{bC}$). As described herein, the controller can calculate the temperature sensor resistance ($R_T$sensor) according to the expression: $R_T$sensor=$(V_{bT}/I_{bC})$. At operation 716, a determination is made as to whether the temperature sensor utilized in the ratiometric temperature measurement system 100 is a RTD or a NTC. When the temperature sensor is determined to be an RTD, the method proceeds to operation 718 to determine the temperature (R(t)) measured by the RTD using the equations at operation 720. When measuring temperatures below 0° C. (i.e., T<0), a first equation is used: R(t)=R0+(A*T)+(B*T$^2$)+(C*(100−T))*t$^3$), where R0 is the nominal resistance value of RTD at 0° C., and values A, B and C are resistance constants as a function of temperature. For example, R0 can be 100 ohms at 0° C. for a platinum 100-type RTD (Pt100) and 1000 ohms at 0° C. for platinum 1000-type RTD (Pt1000). The resistance values can be set, for example, as follow: resistance value A can be (3.9083*10$^{-3}$° C.$^{-1}$), value B can be ((−5.775*10−7° C.$^{-2}$), and value C can be ((−4.183*10-12° C.$^{-4}$). In one or more non-limiting embodiments, R0, A, B and C are provided by the manufacturer of the RTD (e.g., the RTD data sheet provided by the manufacturer).

When measuring temperatures (R(t)) above 0° C. (i.e., T>0), however, a second equation is used: R(t)=R0+(A*T)+(B*T$^2$). Accordingly, the determined temperature (Tout) measured by the RTD is output at operation 722, and the method ends at operation 724.

When, however, the temperature sensor is determined to be an NTC at operation 716, the method proceeds to operation 717 to determine the temperature (R(t)) measured by the NTC using the equation at operation 719 According to a non-limiting embodiment, the equation used by the NTC includes:

$$R(t)=R25*e^{(B*[(1/Tc)-(1/T1)])}, \qquad \text{Eq. 2}$$

Eq. 2 where "R25" is the NTC resistance at 25° C. (298.15 Kelvin (K)), value "B" is a resistance constant as a function of temperature, T1 is the Kelvin temperature at 25° C. (298.15 K), and Tc is the Kelvin temperature at which the resistance (R(t)) is calculated. In one or more non-limiting embodiments, R25 is equal, or substantially equal, to R(t) corresponding to temperature (T).

In one or more non-limiting embodiments, R25 and the value "B" can be provided by the manufacturer of the NTC (e.g., the NTC data sheet provided by the manufacturer). For example, "R25" can be set at 5 kΩ The resistance constant B can represent the exponential co-efficient for resistance variation across the measurement range, and can be set, for example, as 3433$k$ across its range of measuring temperature" at 5 kΩ Accordingly, the determined temperature (Tout) measured by the NTC is output at operation 722, and the method ends at operation 724.

As described herein, various non-limited embodiments provide a ratiometric temperature measurement system configured to perform a ratio metric measurement technique that cancels and effectively removes an offset error introduced by an amplifier gain circuit. In addition, the ratiometric temperature measurement system includes a sensing circuit that implements an adjustable linearization resistance element which facilitates compatibility using either an RTD or an NTC as the temperature sensor.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "about" is intended to include the degree of error associated with measurement of the particular quantity based upon the equipment available at the time of filing the application.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A ratiometric temperature measurement system comprising:
    a sensing circuit configured to measure a temperature, the sensing circuit including a temperature sensing circuit and a current sensor, the sensing circuit being configured to utilize an electrical current (Io) to output a first voltage indicative of a first voltage differential ($V_{T\_SENSOR}$) across the temperature sensing circuit and to output a second voltage indicative of a second voltage differential ($V_{C\_SENSOR}$) across the current sensor; and
    a controller configured to determine a resistance ($R_{T\_SENSOR}$) corresponding to the temperature sensing circuit based at least in part on the first and second voltage differentials ($V_{T\_SENSOR}$ and $V_{C\_SENSOR}$), and to determine a temperature value ($T_{OUT}$) indicative of the measured temperature based on the resistance ($R_{T\_SENSOR}$), wherein the controller comprises:

memory configured to store a look-up table (LUT) populated with a plurality of predetermined resistance values that are mapped to corresponding predetermined temperature values; and a processor in signal communication with the memory, the processor configured to compare the resistance ($R_{T\_SENSOR}$) to the predetermined resistance values, select a predetermined temperature value corresponding to the predetermined resistance value that matches the resistance ($R_{T\_SENSOR}$), and output the selected predetermined temperature value as the temperature value ($T_{OUT}$).

2. The ratiometric temperature measurement system of claim 1, wherein the controller determines a current level ($I_{exc}$) of the current ($I_o$) based on the second voltage differential ($V_{C\_SENSOR}$) indicated by the current sensor and a resistance ($R_{C\_SENSE}$) of the current sensor.

3. The ratiometric temperature measurement system of claim 2, wherein the resistance ($R_{T\_SENSOR}$) is determined as a ratio of the first voltage differential ($V_{T\_SENSOR}$) to the current level ($I_{exc}$).

4. The ratiometric temperature measurement system of claim 3, wherein the sensing circuit comprises:
a temperature sensor configured to effect the first voltage differential ($V_{T\_SENSOR}$) in response to the current (Io); and
an adjustable linearization resistance element ($R_p$) configured to selectively add or remove a resistance realized by the temperature sensor.

5. The ratiometric temperature measurement system of claim 4, wherein the temperature sensor includes a first terminal connected to the current sensor to receive the current and a second terminal connected to a ground potential.

6. The ratiometric temperature measurement system of claim 5, wherein the temperature sensor is an RTD, and the adjustable linearization resistance element is connected in parallel with the RTD so as to establish an open circuit in parallel with the RTD.

7. The ratiometric temperature measurement system of claim 5, wherein the temperature sensor is an NTC and the adjustable linearization resistance element is connected in parallel with the NTC to establish a targeted resistance that shunts the NTC and linearizes the first voltage differential.

8. The ratiometric temperature measurement system of claim 5, further comprising a current excitation circuit including a constant current source configured to generate the current.

9. The ratiometric temperature measurement system of claim 8, wherein the current sensor is in signal communication with the current excitation circuit and is configured to effect the second voltage differential ($V_{C\_SENSOR}$) thereacross in response to the current.

10. The ratiometric temperature measurement system of claim 9, wherein the current sensor includes a current sense resistor having a fixed resistance that defines the resistance ($R_{C\_SENSE}$) of the current sensor.

11. The ratiometric temperature measurement system of claim 10, wherein a voltage drop across the sense resistor defines the second voltage differential ($V_{C\_SENSOR}$).

12. The ratiometric temperature measurement system of claim 11, further comprising:
a multiplexer (MUX) configured to selectively output the first voltage differential ($V_{T\_SENSOR}$) or the second voltage differential ($V_{C\_SENSOR}$) in response to a control signal generated by the controller; and
an amplifier circuit in signal communication with the MUX, the amplifier circuit configured to amplify the first voltage differential ($V_{T\_SENSOR}$) and to amplify the second voltage differential ($V_{C\_SENSOR}$).

13. The ratiometric temperature measurement system of claim 12, further comprising a filter circuit in signal communication with the sensing circuit, the filter circuit configured to filter the first voltage differential ($V_{T\_SENSOR}$) and the second voltage differential ($V_{C\_SENSOR}$) and output the filtered first and second voltage differentials to the amplifier circuit.

14. The ratiometric temperature measurement system of claim 13, further comprising an analog-to-digital converter (ADC) including an input connected to the amplifier circuit and an output connected to the controller, the ADC being configured to generate a first digital signal indicative of the first voltage differential ($V_{T\_SENSOR}$) and a second digital signal indicative of the second voltage differential ($V_{C\_SENSOR}$).

15. A method of measuring a temperature, the method comprising:
delivering an electrical current (Io) to a sensing circuit;
outputting a first voltage from a temperature sensor included in a temperature sensing circuit included in the sensing circuit in response to the electrical current, the first voltage indicative of a first voltage differential ($V_{T\_SENSOR}$);
selectively adding or removing a resistance realized by the temperature sensor using an adjustable linearization resistance element ($R_p$);
outputting a second voltage from a current sensor included in the sensing circuit, the second voltage indicative of a second voltage differential ($V_{C\_SENSOR}$);
determining, using a controller, a resistance ($R_{T\_SENSOR}$) corresponding to the temperature sensing circuit based at least in part on the first and second voltage differentials ($V_{T\_SENSOR}$ and $V_{C\_SENSOR}$); and
determining, using the controller, a temperature value ($T_{OUT}$) indicative of the temperature based on the resistance ($R_{T\_SENSOR}$).

16. The method of claim 15, further comprising:
populating a look-up table (LUT) with a plurality of predetermined resistance values that are mapped to corresponding predetermined temperature values;
comparing, by the controller, the resistance ($R_{T\_SENSOR}$) to the predetermined resistance values;
selecting, by the controller, a predetermined temperature value corresponding to the predetermined resistance value that matches the resistance ($R_{T\_SENSOR}$); and
outputting, by the controller, the selected predetermined temperature value as the temperature value ($T_{OUT}$).

17. The method of claim 15, further comprising determining, using the controller, a current level ($I_{exc}$) of the current ($I_o$) based on the second voltage differential ($V_{C\_SENSOR}$) indicated by the current sensor and a resistance ($R_{C\_SENSE}$) of the current sensor.

18. The method of claim 17, further comprising determining the resistance ($R_{T\_SENSOR}$) as a ratio of the first voltage differential ($V_{T\_SENSOR}$) to the current level ($I_{exc}$).

* * * * *